(12) United States Patent
Reece et al.

(10) Patent No.: US 7,232,145 B1
(45) Date of Patent: Jun. 19, 2007

(54) TRAILER HITCH ALIGNMENT MECHANISM

(76) Inventors: Clyde Reece, P.O. Box 541, Fairfield, TX (US) 75840; Joel L. Reece, Sr., P.O. Box 541, Fairfield, TX (US) 75840

( * ) Notice: Subject to any disclaimer, the term of this patent is extended or adjusted under 35 U.S.C. 154(b) by 25 days.

(21) Appl. No.: 11/141,717

(22) Filed: May 31, 2005

(51) Int. Cl.
*B60D 1/36* (2006.01)

(52) U.S. Cl. ................... 280/477; 280/432; 280/504; 280/511; 280/507

(58) Field of Classification Search .............. 280/477, 280/432, 504, 511, 507
See application file for complete search history.

(56) References Cited

U.S. PATENT DOCUMENTS

| | | | |
|---|---|---|---|
| 3,363,318 A | 1/1968 | Folkins | |
| 3,858,966 A | 1/1975 | Lowell, Jr. | |
| 3,901,536 A * | 8/1975 | Black | 280/477 |
| 4,583,481 A | 4/1986 | Garrison | |
| 4,666,176 A * | 5/1987 | Sand | 280/477 |
| 6,209,902 B1 | 4/2001 | Potts | |
| 6,273,448 B1 | 8/2001 | Cross | |
| 6,585,281 B1 * | 7/2003 | Voorting | 280/477 |
| 6,827,363 B1 * | 12/2004 | Amerson | 280/477 |
| 2004/0251659 A1 * | 12/2004 | Amerson | 280/477 |
| 2005/0194761 A1 * | 9/2005 | Givens | 280/477 |

\* cited by examiner

*Primary Examiner*—Lesley D. Morris
*Assistant Examiner*—Marlon Arce-Diaz

(57) ABSTRACT

A mechanism for ensuring that a trailer is properly attached to a trailer hitch on the back of a vehicle. The mechanism ensures that the trailer tongue on the trailer is properly and securely mounted on the metal ball on the trailer hitch on the vehicle.

2 Claims, 3 Drawing Sheets

TRAILER HITCH ALIGNMENT MECHANISM

BACKGROUND OF THE INVENTION

The present invention concerns that of a new and improved mechanism for ensuring that a trailer is properly attached to a trailer hitch on the back of a vehicle.

DESCRIPTION OF THE PRIOR ART

U.S. Pat. No. 3,363,318, issued to Folkins, discloses a trailer hitch sight assembly using a slotted bar and support to assist in the vertical alignment of the vehicles.

U.S. Pat. No. 4,583,481, issued to Garrison, discloses a device to allow a user to easily hitch one vehicle to the tongue and a horizontal bar with a v-shaped guide.

U.S. Pat. No. 6,209,902, issued to Potts, discloses a vehicle hitch and trailer alignment system comprised of a projecting device mounted to a support pole attached to a hitch ball for lining up with a target on the trailer tongue.

U.S. Pat. No. 3,858,966, issued to Lowell, Jr., discloses a means for allowing a driver to vertically align a vehicle with a trailer to allow for them to be interconnected using a tubular attachment with a horizontal indicator.

U.S. Pat. No. 6,273,448 issued to Cross, discloses a device for assisting a user in aligning a trailer hitch and tongue, comprised of a set of locator posts, one having a light source.

SUMMARY OF THE INVENTION

The present invention concerns that of a new and improved mechanism for ensuring that a trailer is properly attached to a trailer hitch on the back of a vehicle. The mechanism ensures that the trailer tongue on the trailer is properly and securely mounted on the metal ball on the trailer hitch on the vehicle.

There has thus been outlined, rather broadly, the more important features of a trailer hitch attaching mechanism that the detailed description thereof that follows may be better understood and in order that the present contribution to the art may be better appreciated. There are, of course, additional features of the trailer hitch attaching mechanism that will be described hereinafter and which will form the subject matter of the claims appended hereto.

In this respect, before explaining at least one embodiment of the trailer hitch attaching mechanism in detail, it is to be understood that the trailer hitch attaching mechanism is not limited in its application to the details of construction and to the arrangements of the components set forth in the following description or illustrated in the drawings. The trailer hitch attaching mechanism is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present trailer hitch attaching mechanism. It is important, therefore, that the claims be regarded as including such equivalent constructions insofar as they do not depart from the spirit and scope of the present invention.

It is therefore an object of the present invention to provide a trailer hitch attaching mechanism which has all of the advantages of the prior art and none of the disadvantages.

It is another object of the present invention to provide a trailer hitch attaching mechanism which may be easily and efficiently manufactured and marketed.

It is another object of the present invention to provide a trailer hitch attaching mechanism which is of durable and reliable construction.

It is yet another object of the present invention to provide a trailer hitch attaching mechanism which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
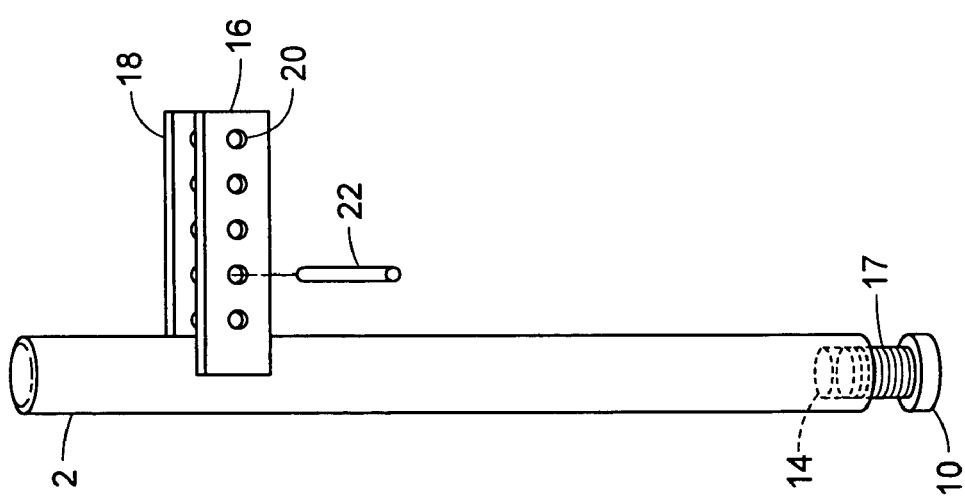
FIG. 1 shows a close-up side view of the first pole that is attached to the trailer hitch on the back of a vehicle.

FIG. 1 shows a close-up side view of the first pole 2 that is attached to the trailer hitch 4 on the back of a vehicle 6. First pole 2 has two ends, a top end and a bottom end, and is attached to the trailer hitch 4 immediately in front of the ball 8 that is used to attach to trailers.

First pole 2 itself is mounted on a magnet 10, with the magnet 10 actually being attached to the trailer hitch 4. First pole 2 is threadably attached to the top of the magnet 10, which has a small connector 14 on top of it to show the presence of the threads 17. The bottom end of the first pole 2 is threadably attached to these threads 17.

First pole 2 also has a pair of guides 16 and 18 that are attached near the top end of the first pole 2. These guides 16 and 18 are parallel to one another and have the same length. Each guide 16 and 18 has a plurality of holes 20 in it set up in a cylindrical manner, with each hole on guide 16 lining up with a hole on guide 18. A three-inch long pin 22 can be then inserted through one hole on guide 16 and one hole on guide 18 when needed.

Figure 2:
FIG. 2 shows a close-up side view of the second pole that is attached to the trailer hitch on the front of a trailer.

FIG. 2 shows a close-up side view of the second pole 26 that is attached to the trailer hitch 28 on the front of a trailer 30. Second pole 26 has two ends, a top end and a bottom end, and is attached to the trailer hitch 28 immediately on top of the trailer tongue 40 that is used to place on top of the ball 8 when the trailer 30 is properly attached to the vehicle 6.

Second pole 26 itself is mounted on a magnet 32, with the magnet 32 actually being attached to the trailer hitch 28. Second pole 26 is threadably attached to the top of the magnet 32, which has a small connector 34 on top of it to allow for the presence of the threads 36. The bottom end of the second pole 26 is threadably attached to these threads 36.

Figure 3:
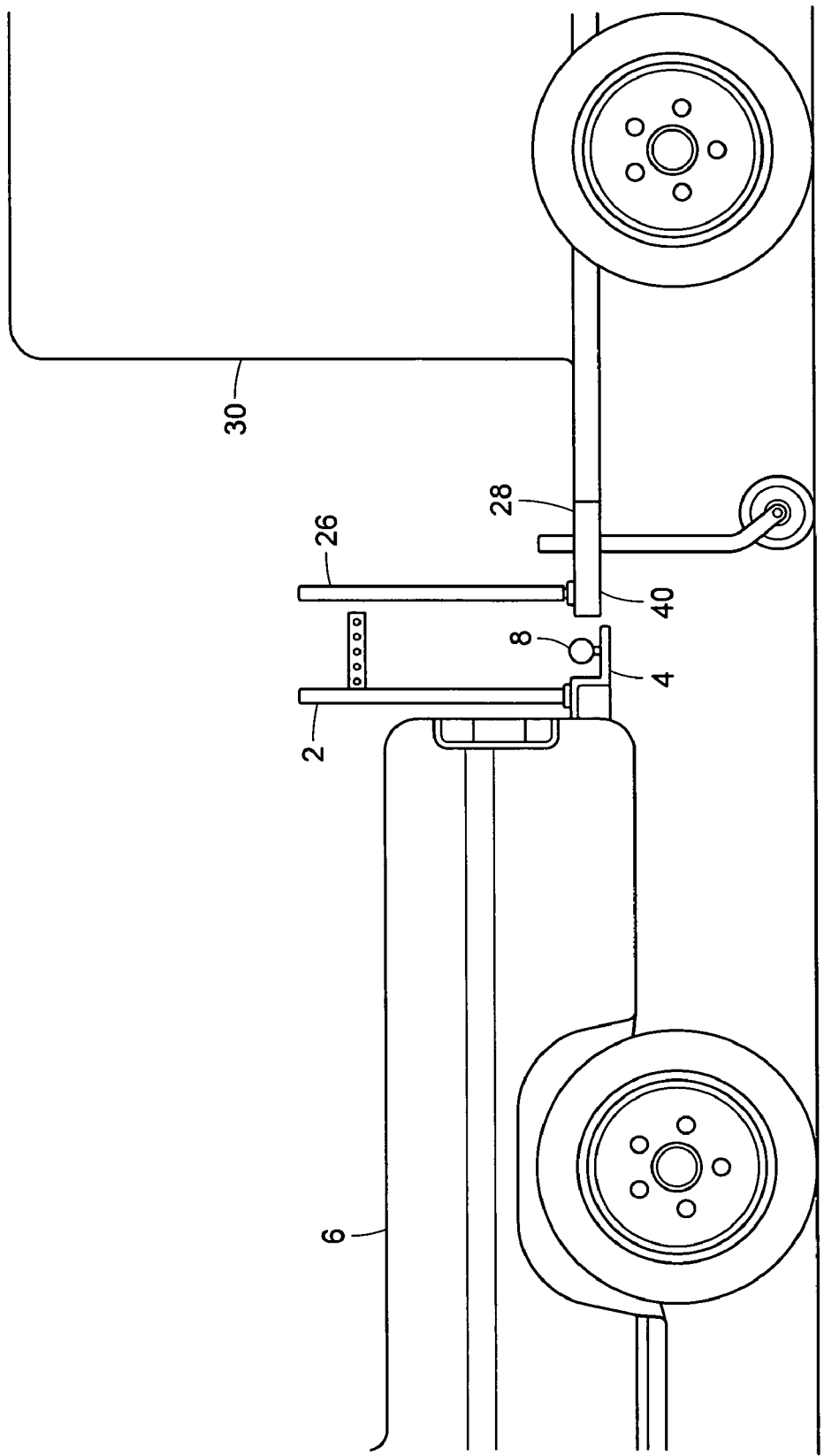
FIG. 3 shows a side view of the two poles as they appear before the ball on the vehicle trailer hitch and the trailer tongue are attached.
Figure 4:
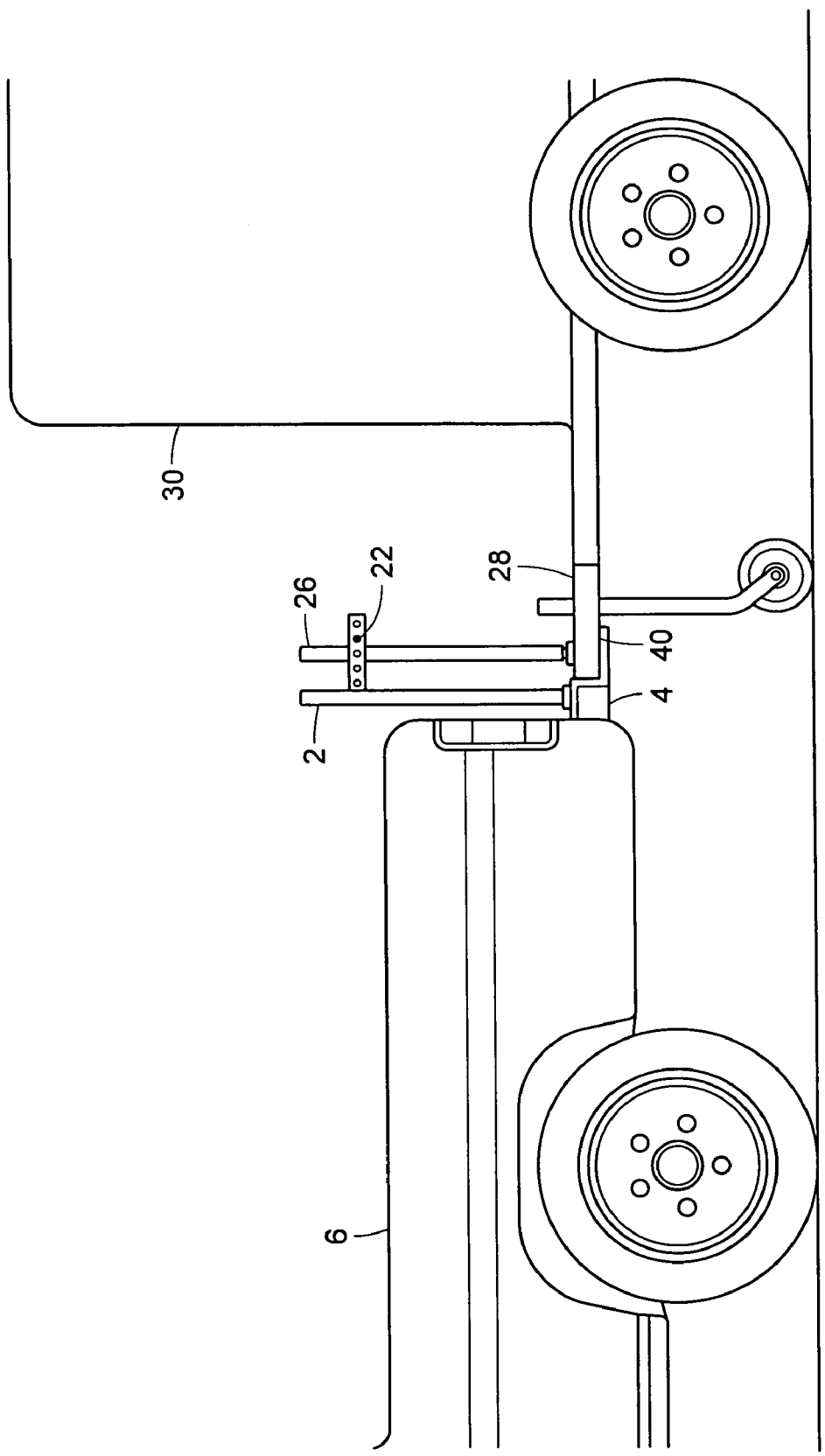
FIG. 4 shows a side view of the two poles as they appear after the ball on the vehicle trailer hitch and the trailer tongue are attached.

FIG. 3 shows a side view of the two poles 2 and 26 as they appear before the ball 8 on the vehicle trailer hitch 4 and the trailer tongue 40 are attached, while FIG. 4 shows a side view of the two poles 2 and 26 as they appear after the ball 8 on the vehicle trailer hitch 4 and the trailer tongue 40 are attached.

FIGS. 3 and 4 demonstrate how the present invention is used to properly ensure that the ball 8 on the vehicle trailer hitch 4 and the trailer tongue 40 are properly connected to one another once the trailer is finally attached to the vehicle. First, an individual would want to place the trailer tongue 40 right next to the ball 8 and visually "match up" the proper height of the ball 8. Then, the individual would make the sure the bottom ends of the two poles 2 and 26 are matched up. If they are not, then an individual can adjust one or two of them upward or downward, as needed, until the bottom end of each of the poles 2 and 26 matches in a manner parallel to the ground surface.

Next, an individual would lift the trailer tongue 40 up, move the trailer tongue 40 over the location of the ball 8, and then lower the trailer tongue 40. The individual would keep lowering the trailer tongue 40 down until it completely covers the ball 8. However, many times when it "appears" that a trailer tongue 40 and a ball 8 are properly attached, they are not. The presence of the poles 2 and 26, however, will ensure that an individual is aware as to whether the trailer tongue 40 is in fact properly mounted on the ball 8.

Once the trailer tongue 40 is properly mounted on the ball 8, as measured by observing the bottom end of the poles 2 and 26, then an individual can install the various safety mechanisms to make sure the trailer tongue 40 is properly mounted on the ball 8. Also, the pole 26, now in between the guides 16 and 18 as shown in FIG. 4, can be secured in place through the use of pin 22, which can be then inserted through one hole on guide 16 and one hole on guide 18. Pin 22 provides yet another safety mechanism for maintaining a proper connection between the vehicle 6 and the trailer 30.

We claim:

1. A safety apparatus for use when attaching a trailer to a vehicle trailer hitch, the vehicle trailer hitch being located on the back of a vehicle, the safety apparatus comprising:

a first magnet attached to the vehicle trailer hitch on the back of a vehicle, a mounting ball attached to the vehicle trailer hitch, a first pole having two ends, a top end and a bottom end, the bottom end of the first pole being threadably attached to the first magnet on the vehicle trailer hitch, a pair of guides comprising a first guide and a second guide, each of the guides being attached to the first pole near the top end of the first pole, each of the guides being parallel to one another, each of the guides having the same length as each other, each of the guides having a plurality of holes, a trailer, (f) a front-mounted trailer hitch attached to the trailer, the front-mounted trailer hitch including a trailer tongue, a second magnet attached to the front-mounted trailer hitch, a second pole having two ends, a top end and a bottom end, the bottom end of the second pole being threadably attached to the second magnet on the front-mounted trailer hitch, the second pole having the same height as the first pole, a pin, wherein the pin is inserted through a hole in the first guide and a hole in the second guide, means for determining whether the trailer tongue is properly placed over the mounting ball attached to the vehicle trailer hitch, wherein the individual places the trailer tongue over the mounting ball attached to the vehicle trailer hitch.

2. A method for attaching a trailer to a vehicle trailer hitch with the safety apparatus according to claim 1 and further comprising:

lowering the trailer tongue over the mounting ball attached to the vehicle trailer hitch until it is properly mounted, analyzing the height of the first pole and the second pole and comparing the differences, and recognizing that the trailer tongue is properly placed over the mounting ball attached to the vehicle trailer hitch if the height of the first pole and the height of the second pole are the same.

* * * * *